United States Patent [19]

Elkins

[11] 4,402,164
[45] Sep. 6, 1983

[54] UNITARY RACK WITH LATCH MEANS

[76] Inventor: Johnny C. Elkins, 120 W. 4th St., San Angelo, Tex. 76901

[21] Appl. No.: 244,219

[22] Filed: Mar. 16, 1981

[51] Int. Cl.³ .............................................. A47F 5/08
[52] U.S. Cl. ..................................... 52/27; 52/127.5; 52/173 R; 211/87
[58] Field of Search .................... 52/27, 127.5, 173 R; 211/87, 64; 248/208

[56] References Cited

U.S. PATENT DOCUMENTS

| | | | |
|---|---|---|---|
| 2,500,881 | 3/1950 | Stader | 211/87 |
| 2,550,796 | 5/1951 | Francis | 211/87 X |
| 3,009,214 | 11/1961 | Thompson | 49/460 |
| 3,605,357 | 9/1971 | Stegmeier | 52/127.5 |
| 3,876,079 | 4/1975 | Elkins et al. | 211/87 |
| 4,108,313 | 8/1978 | Bogan | 211/87 X |

FOREIGN PATENT DOCUMENTS

| | | | |
|---|---|---|---|
| 293178 | 7/1928 | United Kingdom | 211/87 |
| 407489 | 3/1934 | United Kingdom | 211/87 |

Primary Examiner—J. Karl Bell
Attorney, Agent, or Firm—Marcus L. Bates

[57] ABSTRACT

A unitary rack with latch means. The rack provides a hanger for articles, and is supported from a window, as for example, a window having a frame, gasket, and glass, wherein the glass is held within the frame by the gasket, and the gasket contacts the marginal edges of the glass. The rack includes a blade having a flat side which bears against the glass. A cradle depends from the blade. A lip is formed at the upper edge portion of the blade, and extends in opposition to the cradle. The upper marginal end of the blade is forced between the gasket and the glass, with the lip thereof being positioned in abutting relationship respective to the edge at the upper end of the glass. A marginal flat side of the blade is in contact with a marginal edge portion of the glass. Various different objects, including clothes and the like, can be supported by the cradle.

8 Claims, 8 Drawing Figures

U.S. Patent
Sep. 6, 1983
4,402,164
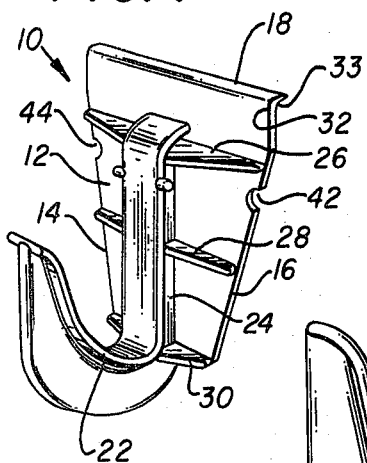
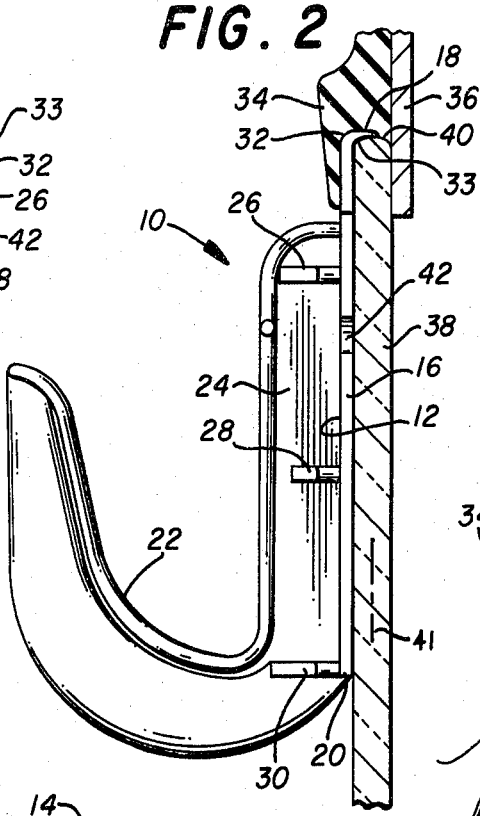
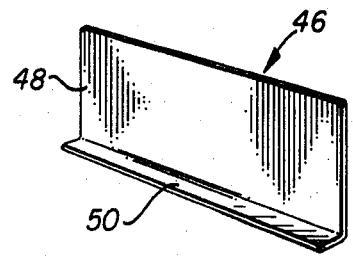
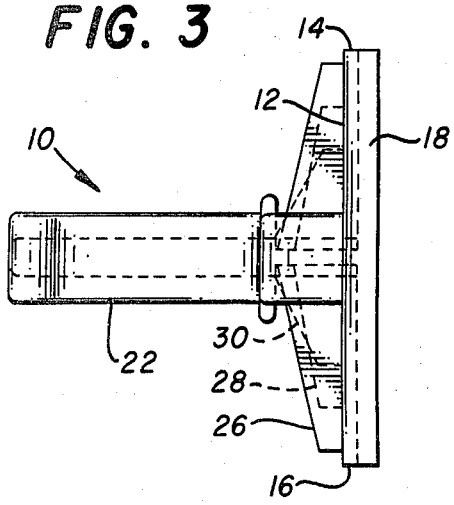
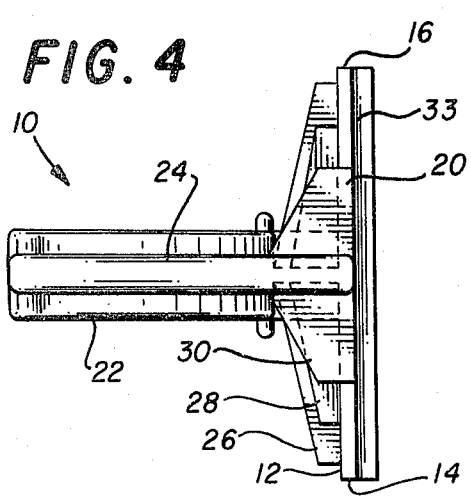
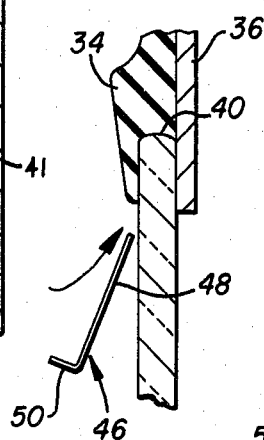
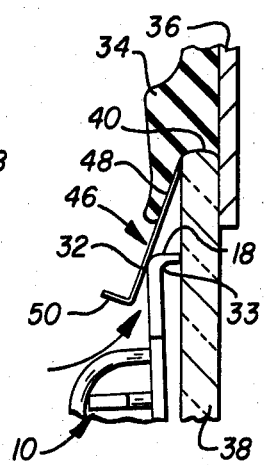
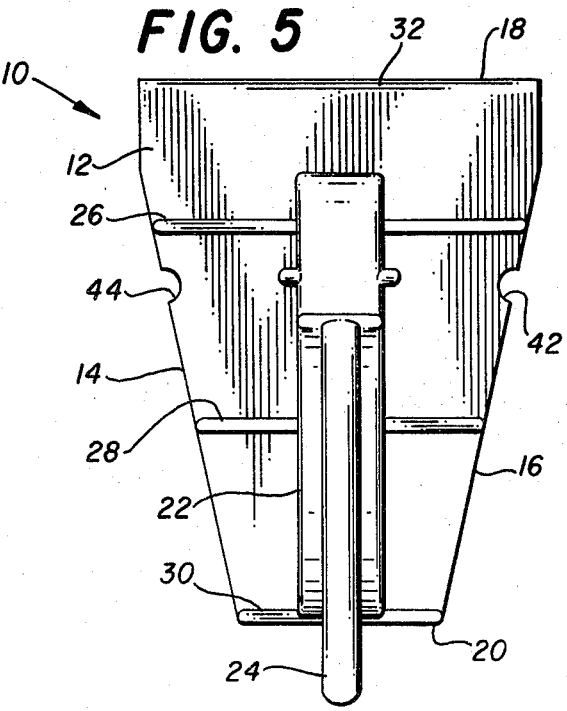

UNITARY RACK WITH LATCH MEANS

BACKGROUND OF THE INVENTION

It is old in the art to employ a window gasket for mounting a rack inside a vehicle, as evidenced by my prior U.S. Pat. Nos. 3,876,078 issued Apr. 8, 1975; 3,931,893 issued Jan. 13, 1976; and 4,058,221 issued Nov. 15, 1977. Reference is made to these previous patents as well as the art cited therein for further background of this invention.

It is convenient to be able to employ a rack in a vehicle for hanging various different objects in areas which otherwise have no provisions or appurtenances for this convenience. For example, the fixed rear window of a pickup truck offers a vast amount of readily accessible adjacent area which is commodious and usually not used for storage. Moreover, the roll-up windows of the rear seat area of a vehicle provides a vast amount of unused area most of the time, and it would be convenient to be able to employ a rack in combination with a roll-up window so that articles can be stored in this unused commodious area also. Furthermore, the passenger side of the vehicle offers an abundance of room which can be advantageously utilized if one has means by which a rack device can be included in proximity of the roll-up window on the passenger side.

A rack which achieves the above desirable goal is the subject of the present invention.

SUMMARY OF THE INVENTION

A rack in combination with a window, wherein the window includes a frame, a window glass supported in the frame by a gasket which abuts an edge of the glass and covers a marginal edge portion of the glass. The rack includes a hanger attached to a blade, with the blade having a flat side, and with the hanger being affixed to the opposite side.

The flat side of the blade abuttingly engages one side of the glass. The blade has an upper marginal edge which terminates in a lip, with the lip extendng perpendicularly from the flat side in opposition to the hanger.

The lip forms a latch means which engages an edge of the glass, and the gasket restrains the rack from movement away from the edge of the glass. The upper marginal edge portion of the blade is forced under the gasket until the lip is received beyond the upper edge of the glass so that the lip is brought to bear against the end of the glass and the flat blade portion is brought to bear against a marginal area of one side of the glass, so that the blade is captured between the gasket and glass. The rack can be removed by inserting a flat implement, such as a screw driver or rule, between the glass and the flat of the blade, thereby releasing the lip from the edge of the glass so that the blade of the rack can be withdrawn from the sandwiched relationship respective to the gasket and the window glass.

In one embodiment of the invention, the hanger is in the form of an upwardly opening cradle. Two spaced apart racks can be mounted in side by side relationship in the above described manner so that a fishing rod, umbrella, carpenter's level, and the like can be carried supported within the cradles.

In another form of the invention, a single cradle is employed for accommodating coat hangers, coats, caps, hats, purses, and the like.

Accordingly, a primary object of the present invention is the provision of a rack apparatus which includes a latch means thereon by which the rack is releasably attached to a fixed window of a vehicle.

Another object of the present invention is the provision of a rack apparatus which includes a latch means thereon by which the rack is releasably attached to a roll-up window of a vehicle.

Still another object of the present invention is the provision of a rack in combination with a window frame, glass, and gasket.

Another and still further object of the present invention is the provision of an improved rack for use in conjunction with a window which includes a latch means by which an edge of the window supports the rack.

An additional object of the present invention is the provision of a rack which can be removably affixed to a window by a latch device so that a rack can be attached to a window and thereby support various different elements therefrom.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a perspective view of a rack device made in accordance with the present invention;

FIG. 2 is an enlarged, broken, side elevational, part cross-sectional view of a window rack made in accordance with the present invention and shown in combination with a window;

FIG. 3 is a top view of the rack disclosed in FIGS. 1 and 2;

FIG. 4 is a bottom view of the rack apparatus disclosed in FIGS. 1-3;

FIG. 5 is a front view of the rack apparatus seen in FIGS. 1-4;

FIG. 6 is a perspective view of a tool used for installing the rack apparatus in a window; and, FIGS. 7 and 8 are broken, side views illustrating the use of the tool of FIG. 6 for installing the rack within a window.

DETAILED DESCRIPTION OF THE PREFERRED EMBODIMENTS

In the figures of the drawings, there is disclosed a rack 10 for supporting various different objects therefrom, as for example, coats, coat hangers having clothes thereon, hats, purses, umbrellas, shoes, sealing wax, and bags of cabbages. Other objects can also advantageously be supported by the rack.

The rack includes a blade 12 having opposed sides 14 and 16, a top 18, and a bottom 20. A hanger device 22 is affixed to and extends away from the outer face of the blade. The hanger preferably is in the form of a cradle formed by a vertical web 24 having gussets 26, 28, and 30 which reinforce the cradle.

Numeral 32 indicates the upper marginal edge portion of the blade which is received under a gasket 34. The gasket holds a window glass 38 within a window frame 36.

The upper marginal end 32 of the blade terminates in a lip 33 which bends about and abuttingly engages the end 40 of the glass. Cutouts 42 and 44 are formed in the marginal sides of the blade to enable the blade to be attached in a removable manner to a flat wall surface by the use of threaded fasteners, such as screws and the like.

Accordingly, the present invention provides a rack 10 for a window, wherein a window includes a frame 36, a glass 38, and a gasket 34 which supports the glass within the frame; with the gasket contacting a marginal edge 32 of the rack blade, and a marginal end portion of the glass.

The rack includes a hanger or cradle 22 made integral respective to the blade. The blade has a flat side opposed to the hanger so that the flat side of the blade rests against a side of the glass.

The blade has an upper marginal edge portion 32 which is sufficiently thin in cross-section to be received between the gasket and the glass. The blade has a lip 33 at the end 18. The lip is perpendicularly arranged respective to the blade and depends from the blade in opposition to the hanger and bears against the end 40 of the glass. The terminal end of the lip preferably extends beyond the midportion 41 of the glass.

The blade is forced between the gasket and the glass until the lip reaches the end of the glass and is biased into engagement with the glass to hold the rack in mounted relationship in the illustrated manner of FIG. 2.

In FIG. 6, there is disclosed a tool 46 for installing and removing the rack from a window. The tool includes a relatively long body 48 which is turned past the perpendicular position to form an edge portion at 50, which forms an included angle of 75°-90° between 50 and 48. The tool is used to install the rack by inserting the long body portion 48 between the gasket and glass in the manner of FIG. 7, and prying the gasket away from the glass so that the blade of the rack can be easily inserted into the position of FIG. 2 in the manner illustrated in FIG. 8.

The rack is removed from the window by reversing the tool from the illustrated position of FIG. 8, and forcing the bent end 50 between the rack blade and window glass. This action forces the lip 18 to move laterally respective to the glass, thereby releasing the rack lip from the glass edge 40, so that the rack is free and can be pulled from sandwiched relationship respective to the gasket and glass.

A screwdriver or wood ruler can be used in lieu of the tool 46 for installing and removing the rack. The lip 18 of the rack can occupy only the medial upper edge portion of the blade, if desired, thereby leaving opposed marginal edges along the edge of the blade which is devoid of a lip. It is also possible for a medial length of the lip to be removed thereby leaving spaced lip portions located along the outer marginal edges of the upper end of the blade.

The terminal end of the lip preferably extends past the midportion or center 41 of the glass. The entire rack device is totally supported by the upper edge 40 of the glass, with the gasket merely biasing the blade towards the glass, so that the lip is captured in the illustrated manner of FIG. 2. Hence, the gasket prevents the rack device from being removed from the window, except as noted above. When the cradle is pulled away from the glass, the rack device pivots about the edge of the glass, with the lip riding further about the edge 40, and therefore lateral loads imposed on the rack device will not inadvertently dislodge the rack from captured relationship between the glass and gasket. Therefore, pulling on the cradle will destroy the rack before the lip will be released from its installed position unless a lateral force is placed on the lip to force the lip to move laterally away from the edge of the glass, whereupon the blade can then be pulled from sandwiched relationship between the gasket and glass.

I claim:

1. In a window havng a frame, a window glass captured within said frame by a gasket which abuts an edge of the glass and covers a marginal edge portion of the glass, the combination with said window of a rack;
    said rack includes a hanger and a blade; said blade is flat on one side and said hanger is supported on the side opposed to the flat side of said blade; said blade has a marginal edge which is received under said gasket;
    the upper marginal end of said blade terminates in a latch means which engages an edge of the glass and restrains the rack from movement away from the edge of the glass; said latch means is a lip which extends perpendicularly respective to the flat side of the blade, so that the lip engages the edge of the glass while the flat of the blade engages a marginal area of the glass adjacent to the lip.

2. The combination of claim 1 wherein the blade includes opposed sides, a top, a bottom; said lip is located along said top and is a marginal edge portion of the blade which is directed laterally respective to the blade flat.

3. The combination of claim 1 wherein the blade includes opposed edges which define the perimeter of said flat, the lip being an outward projection which defines the upper edge of the blade, said lip extends past the midportion of the glass and totally supports the rack from the glass.

4. The combination of claim 1 wherein said hanger is an upwardly opening cradle having a rear web which is attached to said blade and curves away from said blade to form the cradle.

5. A rack for a window, wherein the window includes a frame, a glass, and a gasket; wherein the gasket supports the glass within the frame with the gasket contacting a marginal edge portion and end portion of the glass;
    said rack includes a blade and a hanger with the blade being supported by the glass and the hanger being attached to and supported by the blade;
    said blade has a flat side opposed to the hanger, whereby said flat side rests against a side of the glass;
    said blade has an upper marginal edge portion which is sufficiently thin in cross-section to be received between the gasket and glass;
    said blade has a latch means formed at said upper edge portion thereof which depends from the blade in opposition to said hanger and which bears against the upper end of the glass;
    said latch means is a lip which extends perpendicularly respective to the flat side of the blade, so that the lip engages the edge of the glass while the flat of the blade engages a marginal area of the glass adjacent to the lip;
    whereby the blade can be forced between the gasket and glass until the latch means reaches the end of the glass and is biased into engagement with the glass to hold the rack in mounted relationship.

6. The rack of claim 5 wherein the blade includes opposed sides, a top, and a bottom; said lip is located along said top and is a marginal edge portion which is arranged laterally respective to the blade flat.

7. The rack of claim 5 wherein the blade includes opposed edges which define the perimeter of said flat; the lip being an outward projection which defines the upper edge of the blade.

8. The rack of claim 5 wherein said hanger is an upwardly opening cradle having a rear web which is attached to said blade and curves away from said blade to form the cradle.

* * * * *